(12) United States Patent
Kido et al.

(10) Patent No.: US 11,015,541 B2
(45) Date of Patent: May 25, 2021

(54) ENGINE-DRIVEN WORKING MACHINE

(71) Applicant: YAMABIKO CORPORATION, Tokyo (JP)

(72) Inventors: Shota Kido, Hiroshima (JP); Hiroshige Uemoto, Hiroshima (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 16/652,625

(22) PCT Filed: Oct. 31, 2017

(86) PCT No.: PCT/JP2017/039249
§ 371 (c)(1),
(2) Date: Mar. 31, 2020

(87) PCT Pub. No.: WO2019/087276
PCT Pub. Date: May 9, 2019

(65) Prior Publication Data
US 2020/0240339 A1    Jul. 30, 2020

(51) Int. Cl.
*F02D 41/02* (2006.01)
*F01N 3/027* (2006.01)
(Continued)

(52) U.S. Cl.
CPC ........... *F02D 41/029* (2013.01); *F01N 3/027* (2013.01); *F01N 3/2013* (2013.01);
(Continued)

(58) Field of Classification Search
CPC ........ F01N 2610/02; F01N 3/027; F01N 3/18; F01N 3/2013; F01N 3/2066; F02B 37/24;
(Continued)

(56) References Cited

U.S. PATENT DOCUMENTS

| | | | | |
|---|---|---|---|---|
| 8,484,958 | B2 * | 7/2013 | Fujii | F01N 3/035 60/295 |
| 10,138,777 | B2 * | 11/2018 | Di Perna | F01N 3/021 |

(Continued)

FOREIGN PATENT DOCUMENTS

| | | |
|---|---|---|
| JP | 2005-090454 A | 4/2005 |
| JP | 2006-299955 A | 11/2006 |

(Continued)

OTHER PUBLICATIONS

International Searching Authority, International Search Report and Written Opinion for International Application No. PCT/JP2017/039249, dated Dec. 12, 2017, (11 pages), Japanese Patent Office, Tokyo, Japan.

*Primary Examiner* — Jesse S Bogue
(74) *Attorney, Agent, or Firm* — Alston & Bird LLP

(57) ABSTRACT

An engine-driven working machine 1 is provided with: a diesel engine 10; a generator body 30 driven by the engine 10; an exhaust gas purification device 20 for purifying exhaust gas discharged from the engine 10; a VGT 13 for throttling intake air to the engine 10; and a reserve load 40 which can be connected between the generator body 30 and a load. The VGT 13 is throttled when removing deposition substances in the exhaust gas purification device 20, thereby increasing the temperature of exhaust gas from the engine 10, and the reserve load 40 is connected to the generator body 30 when throttling intake air in order to remove deposition substances in the exhaust gas purification device 20, thereby increasing the amount of intake air to the engine 10.

13 Claims, 7 Drawing Sheets

(51) Int. Cl.
*F01N 3/20* (2006.01)
*F02B 37/24* (2006.01)
*F02B 63/04* (2006.01)
*F02D 9/08* (2006.01)

(52) U.S. Cl.
CPC ............ *F01N 3/2066* (2013.01); *F02B 37/24* (2013.01); *F02B 63/04* (2013.01); *F02D 9/08* (2013.01); *F01N 2610/02* (2013.01)

(58) Field of Classification Search
CPC ...... F02B 63/04; F02D 29/06; F02D 41/0002; F02D 41/0007; F02D 41/027; F02D 41/029; F02D 9/08
See application file for complete search history.

(56) References Cited

U.S. PATENT DOCUMENTS

| | | | |
|---|---|---|---|
| 10,371,031 B2* | 8/2019 | De Smet | ............... F02M 26/15 |
| 2007/0144175 A1* | 6/2007 | Sopko, Jr. | ............... F02B 39/10 |
| | | | 60/605.1 |
| 2007/0220868 A1 | 9/2007 | Nishizawa et al. | |
| 2015/0033716 A1* | 2/2015 | Matsuo | ................. F02D 41/029 |
| | | | 60/320 |
| 2015/0053175 A1* | 2/2015 | Nishimoto | .............. F02D 29/06 |
| | | | 123/350 |
| 2016/0153330 A1 | 6/2016 | Takahashi et al. | |
| 2019/0107066 A1* | 4/2019 | Kurtz | ...................... F01N 3/106 |

FOREIGN PATENT DOCUMENTS

| | | |
|---|---|---|
| JP | 2007-262896 A | 10/2007 |
| JP | 2010-255526 A | 11/2010 |
| JP | 2012-026354 A | 2/2012 |
| JP | 2015-031178 A | 2/2015 |
| JP | 2015-175335 A | 10/2015 |
| JP | 5882408 B2 | 3/2016 |
| JP | 2016-104974 A | 6/2016 |
| JP | 2017-036002 A | 2/2017 |
| JP | 2017-186975 A | 10/2017 |

* cited by examiner

ENGINE-DRIVEN WORKING MACHINE

CROSS REFERENCE TO RELATED APPLICATIONS

This application is a national stage application, filed under 35 U.S.C. § 371, of International Application No. PCT/JP2017/039249, filed Oct. 31, 2017; the contents of which as are hereby incorporated by reference in their entirety.

BACKGROUND

Technical Field

The present disclosure relates to an engine-driven working machine, more particularly to an engine-driven working machine equipped with an exhaust purification apparatus.

Description of Related Art

In an engine-driven power generator using a diesel engine as a driver for a power generator, it is becoming common to provide an aftertreatment apparatus for treating an exhaust gas of the diesel engine.

Purifiers for nitrogen oxides ($NO_x$) in the exhaust gas include, for example, a urea selective catalytic reduction (SCR) apparatus (will be hereinafter referred to as a "urea SCR apparatus") which reduces nitrogen oxide to nitrogen ($N_2$) and water ($H_2O$) using ammonia produced through hydrolysis of urea water as a reducer.

In an atmosphere of about 200° C. to 300° C., part of urea becomes a white deposit (cyanuric acid), which blocks an exhaust passage in the urea SCR apparatus. For this reason, the deposit needs to be removed periodically. In this specification, a process of removing the deposit will be referred to as a "purge process." The purge process, in which the deposit is sublimed for removal, requires a temperature of 250° C. (preferably 350° C.) or higher. Thus, the temperature of the exhaust gas needs to be raised for a certain period of time.

In order to raise the exhaust temperature, for example, the amount of air introduced into a combustion chamber of the engine can be reduced. When the engine is provided with a supercharger, e.g., a turbocharger, in particular a variable geometry turbocharger (VGT), the amount of the air introduced into the combustion chamber can be reduced through adjustment of the opening degree of movable vanes provided for the VGT.

BRIEF SUMMARY

As a result of various studies, the present inventors have confirmed that a combustion pressure decreases when the amount of the air introduced into the combustion chamber is reduced in the purge process, and that a load, if inputted to the engine-driven power generator in this state, deteriorates speed governing performance of the engine, e.g., an engine speed greatly decreases, the engine stalls, and the engine speed does not return and remains low.

It is therefore an object of the present disclosure to solve the above-mentioned conventional problem, and to reduce the deterioration of speed governing performance of an engine which occurs when a purge process is performed for an exhaust purification apparatus such as a urea SCR apparatus.

To achieve the object, the present disclosure inputs a preliminary load (may be hereinafter referred to as a "preload") to a power generator prior to the start of a purge process, thereby increasing the amount of air introduced into a combustion chamber of an engine.

Specifically, the present disclosure is directed to an engine-driven working machine, and the following solution is taken.

That is, a first aspect of the present disclosure is directed to an engine-driven working machine including: a diesel engine; a generator driven by the diesel engine; an exhaust purifier that purifies an exhaust gas emitted from the diesel engine; at least one intake air reducer that reduces an amount of intake air taken into the diesel engine; and a preload that is able to be connected between the generator and a load, the engine-driven working machine reducing the amount of the intake air by means of the intake air reducer to raise a temperature of the exhaust gas emitted from the diesel engine so that a deposit in the exhaust purifier is removed. The engine-driving working machine connects the preload to the generator to increase the amount of the intake air taken into the diesel engine when reducing the amount of the intake air by means of the intake air reducer to remove the deposit in the exhaust purifier.

According to this configuration, the amount of the intake air is reduced by means of the intake air reducer to raise the temperature of the exhaust gas emitted from the diesel engine so that the deposit is removed in the exhaust purifier, and in addition, the preload is connected to the generator to increase the amount of the intake air taken into the diesel engine when reducing the amount of the intake air. Therefore, the temperature of the exhaust gas required to perform a purge process in the exhaust purifier is obtained, and simultaneously, the preload causes a larger amount of air to be introduced into a combustion chamber, thereby increasing an intake pressure. This can reduce deterioration in the speed governing performance.

A second aspect is an embodiment of the first aspect. In the second aspect, the exhaust purifier may be a urea selective catalyst reduction apparatus.

This configuration makes it possible to remove nitrogen oxides ($NO_x$) in the exhaust gas.

A third aspect is an embodiment of the first aspect. In the third aspect, the exhaust purifier may be at least one of a urea selective catalyst reduction apparatus or a diesel particulate filtering apparatus (will be hereinafter referred to as a "DPF apparatus").

In this configuration, nitrogen oxides ($NO_x$) and/or particulate materials (PM) in the exhaust gas can be removed.

A fourth aspect is an embodiment of any one of the first to third aspects. In the fourth aspect, the preload may be connected to the generator before the intake air reducer reduces the amount of the intake air.

For example, if the preload is inputted after the intake air is reduced by the intake air reducer, the increase in the amount of the intake air taken into the engine due to the input of the preload may possibly be delayed. Therefore, in a preferred embodiment, the preload is connected to the generator before the intake air is reduced by the intake air reducer.

A fifth aspect is an embodiment of any one of the first to fourth aspects. In the fifth aspect, the diesel engine may be provided with a turbocharger for supercharging the intake air of the diesel engine, and the intake air reducer may be a movable vane of the turbocharger.

In this configuration, the diesel engine can be increased in output power, and the supercharging pressure of the intake air (boost pressure) can be easily changed.

A sixth aspect is an embodiment of the fifth aspect. In the sixth aspect, the amount of the intake air taken into the diesel engine with the generator and the preload connected together increases when a supercharging pressure of the turbocharger increases.

In this configuration, when the diesel engine is provided with a variable geometry turbocharger as a supercharger, the amount of the intake air taken into the diesel engine can be easily increased.

A seventh aspect is an embodiment of the fifth or sixth aspect. In the seventh aspect, a capacity of the preload may be set such that, when the amount of the intake air is reduced by the intake air reducer to remove the deposit in the exhaust purifier, a supercharging pressure during a no-load operation of the diesel engine becomes 90% or more of the supercharging pressure during the no-load operation before reducing the amount of the intake air.

This configuration makes it possible to maintain the speed governing performance of the engine almost certainly.

An eighth aspect is an embodiment of any one of the first to seventh aspects. In the eighth aspect, the diesel engine may be provided with a throttle valve that adjusts the amount of the intake air taken into the diesel engine, and the intake air reducer may be the throttle valve.

This allows the amount of the intake air to be easily changed.

A ninth aspect is an embodiment of any one of the first to eighth aspects. In the ninth aspect, the preload may be an electric heater.

This configuration is preferable because the electric heater is stably operable and easily available.

A tenth aspect is an embodiment of the ninth aspect. In the tenth aspect, the preload may be arranged in an exhaust passage of the diesel engine.

This allows the electric heater as the preload to be easily cooled without providing any other means.

An eleventh aspect is an embodiment of any one of the first to tenth aspects. In the eleventh aspect, the deposit in the exhaust purifier may be removed every predetermined time.

In this configuration, the purge process is periodically performed, and the exhaust purifier can maintain its purification capability.

A twelfth aspect is an embodiment of any one of the first to eleventh aspects. In the twelfth aspect, a capacity of the preload may be set such that, when the amount of the intake air is reduced by the intake air reducer to remove the deposit in the exhaust purifier, a load factor during a no-load operation of the diesel engine becomes 30% or more. The load factor of the engine is the ratio of an engine torque to the maximum engine torque at a predetermined engine speed (the engine rotates at a constant speed). This configuration makes it possible to maintain the speed governing performance of the engine almost certainly.

A thirteenth aspect is an embodiment of any one of the first to twelfth aspects. In the thirteenth aspect, the engine-driven working machine may further include: an engine controller that controls an operation of the diesel engine; and a preload controller that controls an operation of the preload. The engine controller may transmit a purge request signal for requesting a purge process of removing the deposit in the exhaust purifier to the preload controller, and the preload controller may turn the preload on when the purge request signal is received.

Provision of at least the engine controller and the preload controller in this way makes it possible to perform cooperative control of the timing of inputting the preload with respect to the periodic or irregular purge request from the engine controller.

A fourteenth aspect is an embodiment of the thirteenth aspect. In the fourteenth aspect, the engine-driven working machine may further include a controller that transmits a purge prohibition signal for prohibiting the purge process and a purge prohibition cancellation signal for canceling the purge prohibition signal to the engine controller. The controller may transmit the purge prohibition signal to the engine controller in a normal operation, and transmit the purge prohibition cancellation signal to the engine controller after a predetermined time has passed since the receipt of the purge request signal.

This configuration makes it possible to appropriately perform cooperative control of the timing of inputting the preload before the purge process is started.

A fifteenth aspect is an embodiment of the fourteenth aspect. In the fifteenth aspect, the controller may transmit the purge prohibition cancellation signal to the engine controller when the boost pressure is greater than a threshold for a predetermined time, when an engine load factor is greater than a threshold for a predetermined time, or after a predetermined time has passed since the receipt of the purge request signal.

This configuration makes it possible to appropriately perform cooperative control of the timing of inputting the preload when the boost pressure or the engine load factor is greater than the threshold for a predetermined time.

According to the present disclosure, it is possible to reduce deterioration in speed governing performance of an engine that occurs when a purge process is performed for an exhaust purification apparatus of an engine-driven working machine.

DETAILED DESCRIPTION OF VARIOUS EMBODIMENTS

A urea SCR apparatus for purifying $NO_x$ may be mounted as an exhaust purification apparatus on an engine-driven power generator using a diesel engine as a driver for the power generator. As described above, a purge process needs to be performed on the urea SCR apparatus periodically, for example, every tens of hours. The purge process takes about ten minutes at the maximum. To maintain the performance of the urea SCR apparatus, there has been no other choice but to accept deterioration in the speed governing performance of the engine when a load is inputted in the course of the purge process.

However, if the engine-driven power generator is used in an unattended situation, for example, the deterioration in the speed governing performance cannot be ignored because the response to a continuous load such as a pump and a compressor may be delayed, or a load (device) in use may be stopped.

The inventors of the present application have found that increasing an intake pressure, e.g., a boost pressure, in advance before the purge process by an amount that compensates for the pressure drop can reduce the deterioration in the speed governing performance.

Note that in an engine speed governing performance test, settling time needs to be eight seconds or less at the start of the engine when the load is inputted, and speed variation of the engine at the time of inputting the load needs to be within 10%.

Exemplary Embodiment

An embodiment of the present disclosure will be described in detail below with reference to the drawings. The following description of the embodiments is merely an example in nature, and is not intended to limit the scope, applications, or use of the present disclosure.

An embodiment of the present disclosure will be described below with reference to the accompanying drawings.

Figure 1:
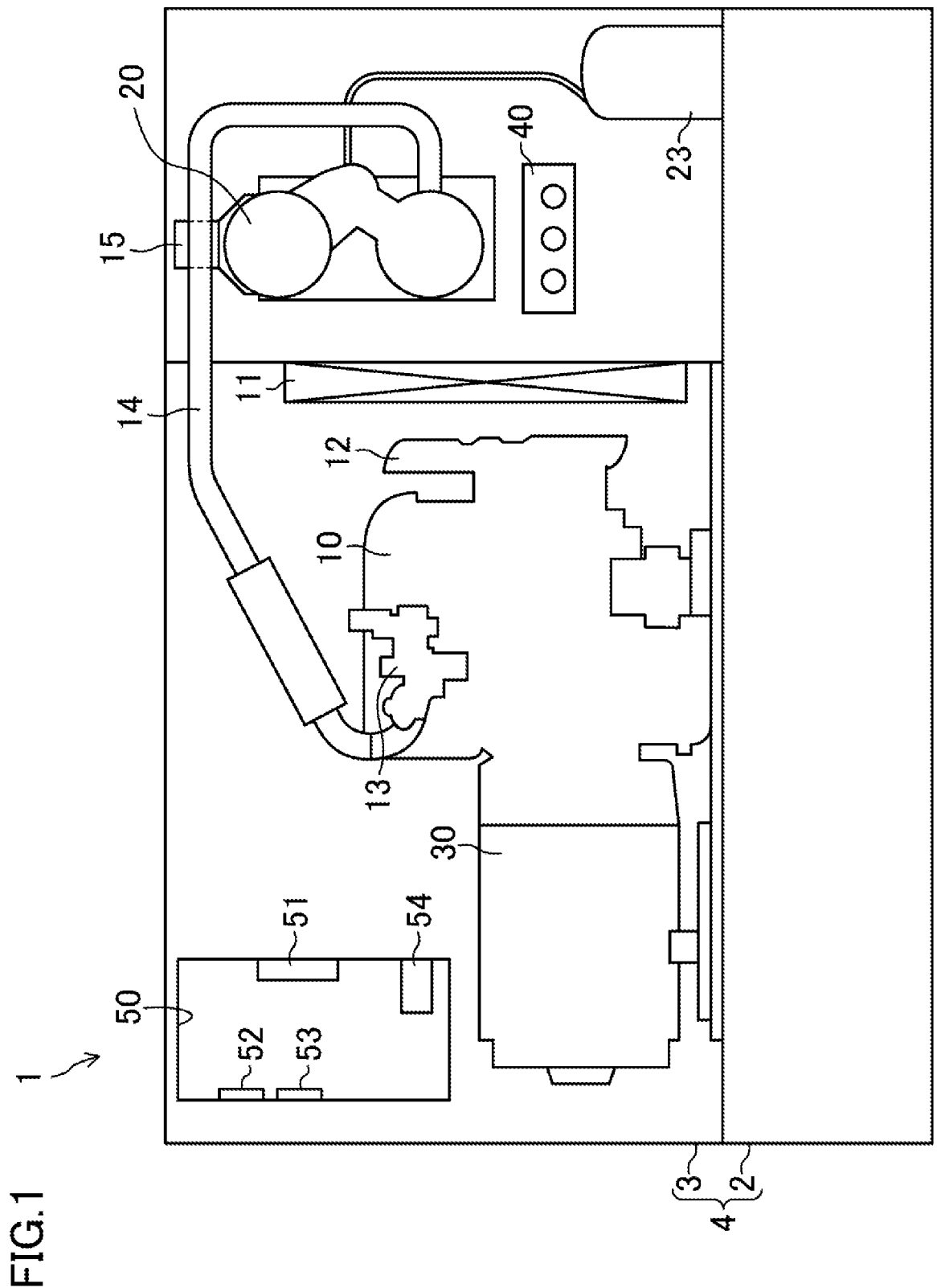
FIG. 1 is a schematic side view of an engine-driven power generator according to an embodiment.

FIG. 1 schematically illustrates a configuration of an engine-driven power generator which is an example of an engine-driven working machine according to an embodiment as viewed from the side. A front bonnet is not shown for the sake of convenience. As shown in FIG. 1, an engine-driven power generator 1 has a housing 4 including a frame 2 serving as a base, and a bonnet 3 covering the frame 2.

The frame 2 carries thereon a water-cooled diesel engine (will be hereinafter simply referred to as an "engine") 10, an exhaust purification apparatus 20 as an exhaust purifier, a generator (power generator) 30 which is a working body to be driven by the engine 10, a preload 40 which is able to be connected between the generator 30 and an electrically connected load (not shown), and a control section 50 which controls the engine 10 and the preload 40. Here, a resistor, e.g., an electric heater or a lamp, can be used as the preload 40. The electric heater or the lamp is stably operable as a load, and is easily available.

A radiator 11 that exchanges heat with a coolant of the engine 10 is provided on the side of the engine 10. A cooling fan 12 that generates cooling air for cooling the radiator 11 is provided on a side surface of the engine 10 facing the radiator 11.

The engine 10 may be provided with, for example, a throttle valve (not shown) which is arranged upstream of an intake manifold and can change the amount of intake air taken into cylinders. The throttle valve is an example of an intake air reducer.

The engine 10 is provided with a turbocharger 13 arranged downstream of an exhaust manifold to supercharge the intake air by means of an exhaust pressure. In a preferred embodiment, the turbocharger 13 is a variable geometry turbocharger (VGT) having movable vanes. The movable vanes are an example of the intake air reducer. The exhaust purification apparatus 20 is connected to a downstream portion of an exhaust pipe 14 which emits an exhaust gas that has passed through the turbocharger 13.

The exhaust purification apparatus 20 is, for example, a urea SCR apparatus connected to the downstream portion of the exhaust pipe 14 to reduce NOR. A urea water tank 23 containing urea water to be added as ammonia to the urea SCR apparatus is disposed on the frame 2 adjacent to the urea SCR apparatus.

The exhaust purification apparatus 20 may be a DPF apparatus that collects particulate materials (PM), and may include both of the urea SCR apparatus and the DPF apparatus. Further, the exhaust purification apparatus 20 has an exhaust gas outlet 15.

The preload 40 is arranged across the radiator 11 from the engine 10 on the frame 2. That is, the preload 40 is disposed in the middle of an exhaust passage, and can be cooled without using any other means. In addition, the preload 40 serves as a shield against engine sound and the air emitted from the radiator 11, thereby reducing the noise of the engine-driven power generator 1.

The control section 50 includes, for example, an engine control module (ECM) 51, an SCR board 52, a control board 53, and a contactor 54. The ECM 51 is an example of an engine controller including the engine 10 and its accessories. The SCR board 52 is an example of a preload controller that controls the contactor 54 connecting or disconnecting the preload 40 and the generator 30. The control board 53 transmits, to the ECM 51, a purge prohibition signal and a cancellation signal for the purge prohibition signal. The control board 53 is an example of a controller. The ECM 51, the SCR board 52, and the control board 53 are respectively provided with a microprocessor, a memory device and an input/output device, and are connected to each other by electrical wiring to be able to communicate with each other. A communication protocol in this case may be, for example, a controller area network (CAN) protocol.

Figure 2:
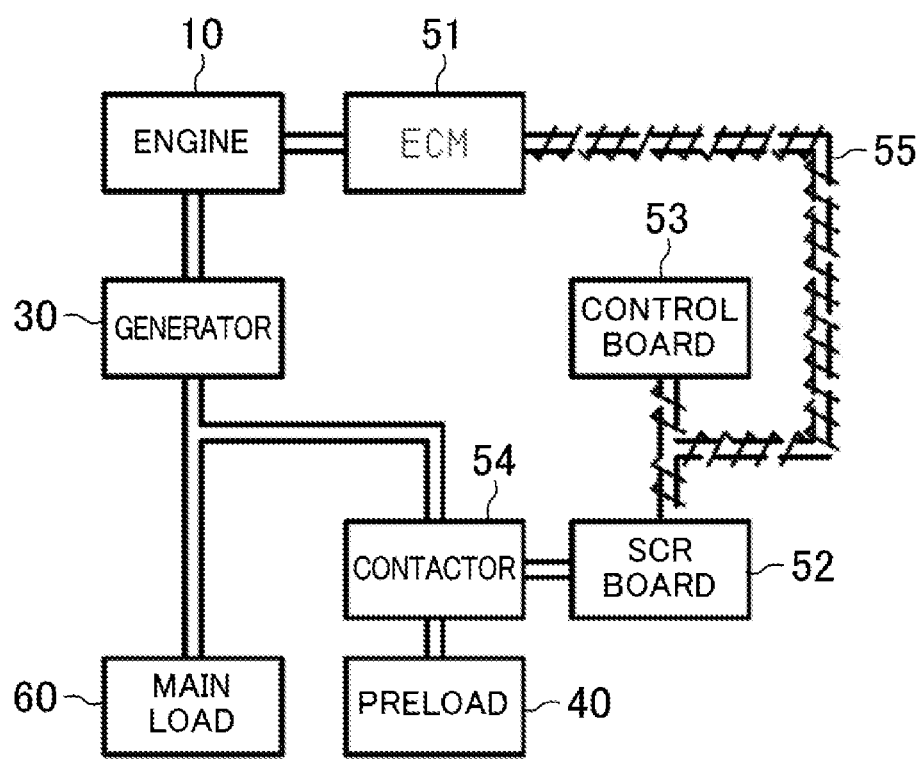
FIG. 2 is a connection diagram of major components of an engine-driven power generator according to an embodiment.

FIG. 2 is a connection diagram of the engine-driven power generator 1 according to the present embodiment. As shown in FIG. 2, the ECM 51, the SCR board 52, and the control board 53 are connected to each other by a twisted pair wire.

The ECM 51 is electrically connected to the engine 10. Specifically, the ECM 51 is electrically connected to a plurality of sensors provided for the engine 10, such as an intake pressure sensor, a supercharging pressure (will be hereinafter referred to as a "boost pressure") sensor, and a torque sensor.

The engine 10 is connected to the generator 30, which is connected to the contactor 54 and a main load (a load used by a user) 60.

The SCR board 52 is connected to the contactor 54, which is connected between the generator 30 and the preload 40 to be able to connect and disconnect the generator 30 and the preload 40.

(Purge Process for Exhaust Purification Apparatus)

Figure 3:
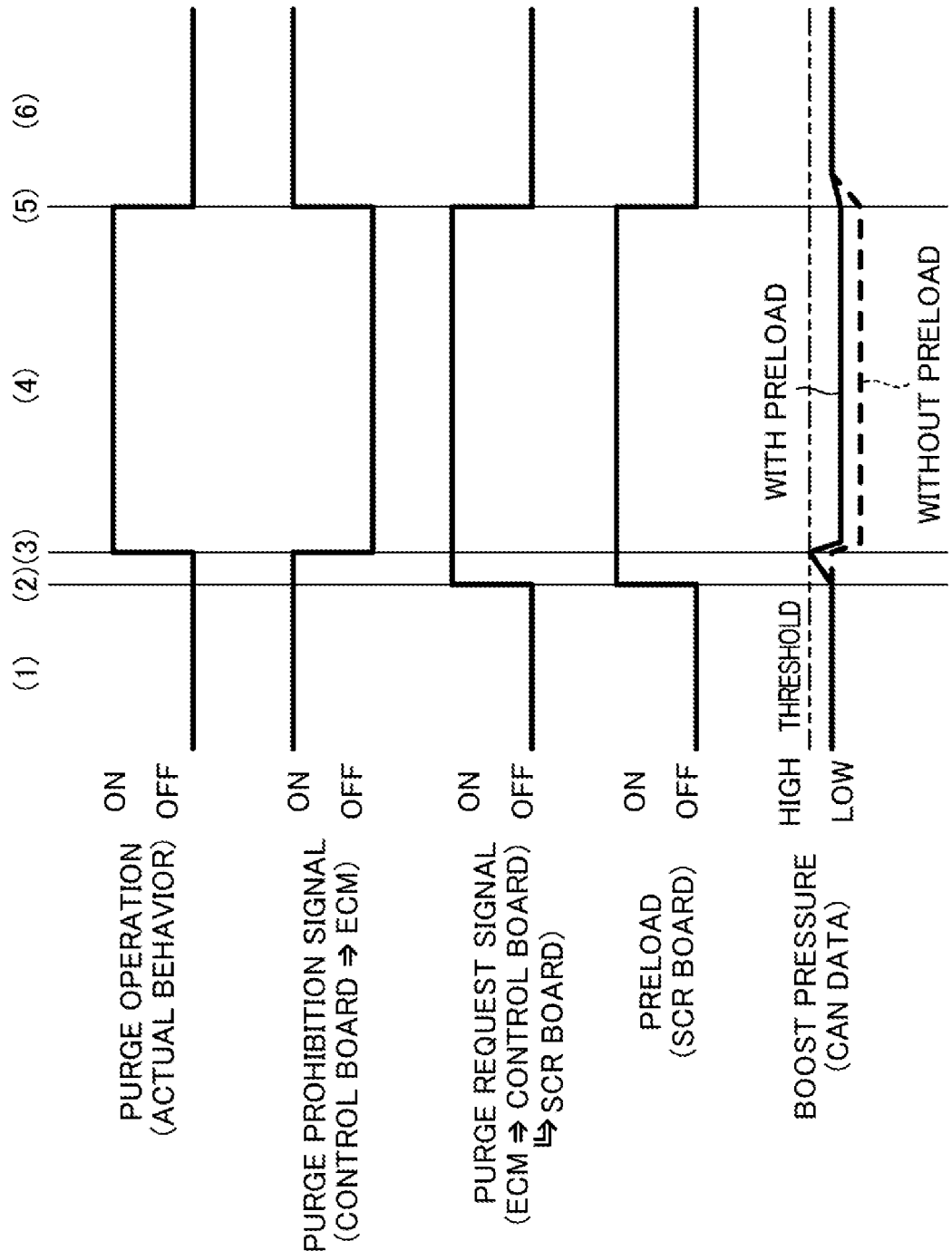
FIG. 3 is a timing chart of an engine-driven power generator according to an embodiment.

FIG. 3 is a timing chart of a purge process performed on the urea SCR apparatus as the exhaust purification apparatus 20. Among a plurality of types of purge processes, the purge process performed in this example is a process of removing a white product (cyanuric acid) deposited in the urea SCR apparatus through sublimation at high temperature.

The timing of performing the purge process will be described below with reference to FIGS. 2 and 3. In this example, the engine-driven power generator 1 is assumed to be in a normal operation state where no purge process is performed.

(1) When the engine 10 is normally operating, the control board 53 transmits a purge prohibition signal to the ECM 51 at a predetermined cycle.

(2) The ECM 51 transmits a purge request signal to the control board 53 and the SCR board 52, for example, every accumulated predetermined operation time, such as every thirty hours. Receiving the purge request signal, the SCR board 52 allows the contactor 54 to connect the preload 40 to the generator 30, thereby turning the preload 40 on.

(3) On the other hand, when the boost pressure or engine load factor of the engine 1 is greater than a predetermined threshold for a predetermined time, the control board 53 having received the purge request signal transmits a cancellation signal for the purge prohibition signal (i.e., an OFF signal for the purge prohibition signal) to the ECM 51. At the same time, the ECM 51 instructs the engine 10 to reduce the amount of intake air, and raises the temperature of the exhaust gas to start the purge process. The reason why the threshold of the engine load factor is also used as the target of the determination in addition to that of the boost pressure is to take a pressure drop that may occur in the case where the engine-driven power generator 1 is used in the highlands into consideration.

To reduce the amount of the intake air taken into the engine 10, intervals of the movable vanes of the turbocharger 13 may be adjusted (increased) or the throttle valve may be slightly closed. Alternatively, both may be performed at the same time.

Figure 6:
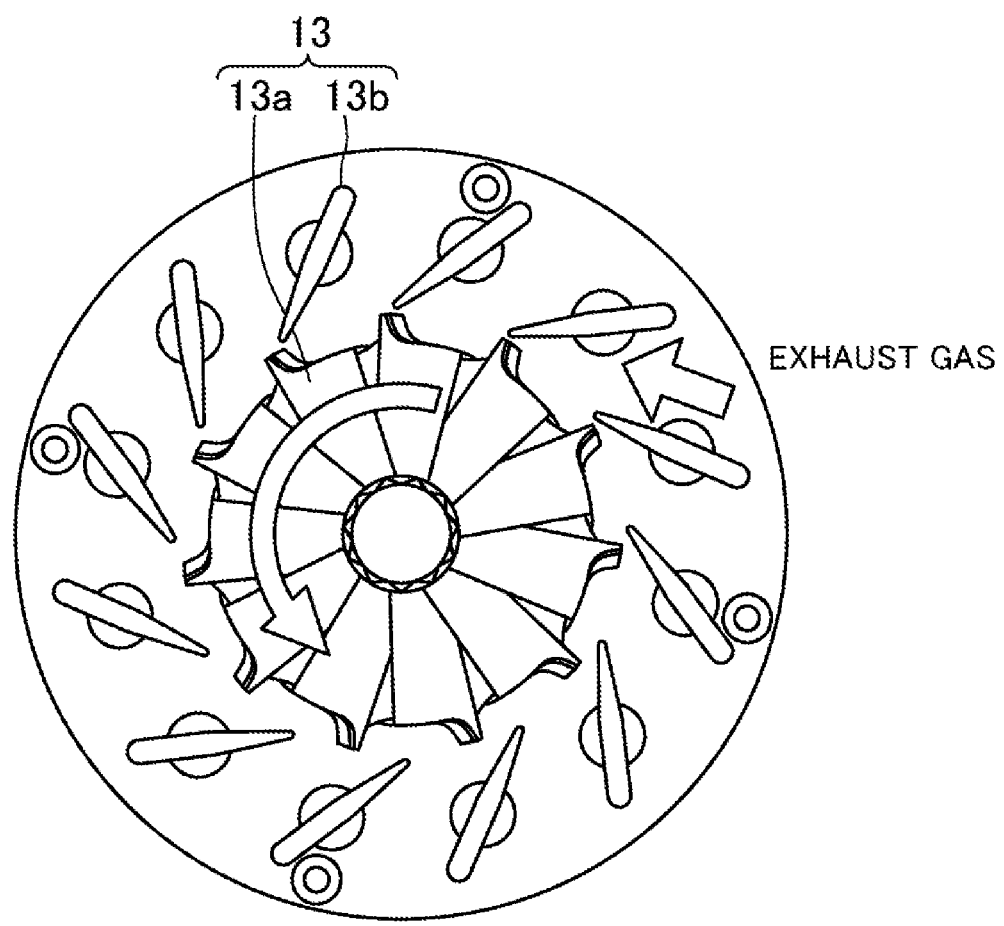
FIG. 6 is a schematic cross-sectional view of a major part of a turbocharger constituting an engine accessory in an engine-driven power generator according to an embodiment.
Figure 7:
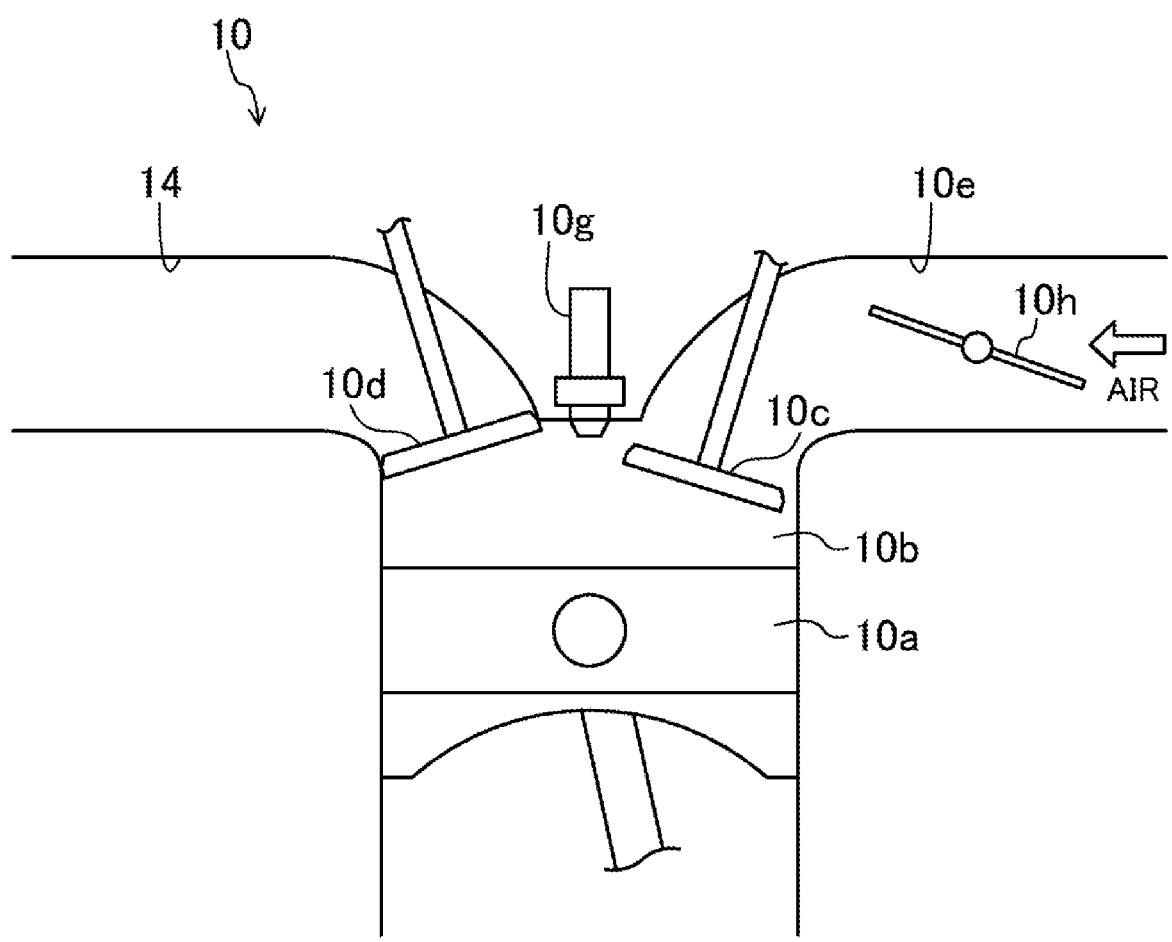
FIG. 7 is a schematic cross-sectional view of a combustion chamber and an intake/exhaust portion that constitute an engine in an engine-driven power generator according to an embodiment.

Here, it will be shown a schematic configuration of an exhaust side (FIG. 6) of the turbocharger 13 which is the VGT and the throttle valve (FIG. 7).

As shown in FIG. 6, the turbocharger 13 includes a turbine wheel 13a that receives the exhaust gas, and a plurality of movable vanes 13b disposed around the turbine wheel 13a to adjust the flow rate of the exhaust gas through adjustment of the intervals therebetween. When the intervals between the movable vanes 13b are slightly increased, the rotation of the turbine wheel 13a is slowed to reduce the amount of the intake air, when the exhaust amount is the same.

As shown in FIG. 7, the engine 10 includes a piston 10a, an intake valve 10c and an exhaust valve 10d which constitute a combustion chamber 10b together with a top surface of the piston 10a, an intake pipe 10e whose downstream end is opened and closed by the intake valve 10c, and an exhaust pipe 14 whose upstream end is opened and closed by the exhaust valve 10d. An injection nozzle 10g for injecting fuel is provided in an upper portion of the combustion chamber 10b between the intake valve 10c and the exhaust valve 10d. A throttle valve 10h that adjusts the flow rate of the intake air is provided in the intake pipe 10e upstream of the intake valve 10c.

(4) As shown in the graph of the boost pressure in the bottom part of FIG. 3, the boost pressure drops at stage (3) in a conventional case where no preload is inputted. If the main load 60 were inputted at this stage, the speed governing performance of the engine 10 would not possibly be maintained. However, in the present embodiment, the preload 40 is previously inputted at stage (2) to raise the boost pressure to a level higher than a predetermined threshold. Thus, even if the boost pressure drops when the purge process is started, the boost pressure can be substantially maintained to that in the normal operation at stage (4). This indicates that the speed governing performance of the engine 10 is improved.

(5) The purge process of the present invention generally ends in ten minutes or less. Thus, when the purge process ends, the ECM 51 transmits a cancellation signal for the purge request signal (an OFF signal for the purge request signal) to the control board 53 and the SCR board 52. The control board 53 transmits the purge prohibition signal to the ECM 51. The ECM 51 that has received the purge prohibition signal instructs the engine 10 to return the amount of the intake air to that in the normal operation, and ends the purge process. Upon receiving the OFF signal of the purge request signal, the SCR board 52 allows the contactor 54 to disconnect the preload 40 and the generator 30, thereby turning the preload 40 off.

(6) After the purge process ends, the control board 53 transmits the purge prohibition signal to the ECM 51 until the next purge request signal is received.

An example of the details of a purge process control flow in the ECM 51, the SCR board 52, and the control board 53 which communicate with each other through the CAN protocol will be described below with reference to the accompanying drawings.

Figure 4:
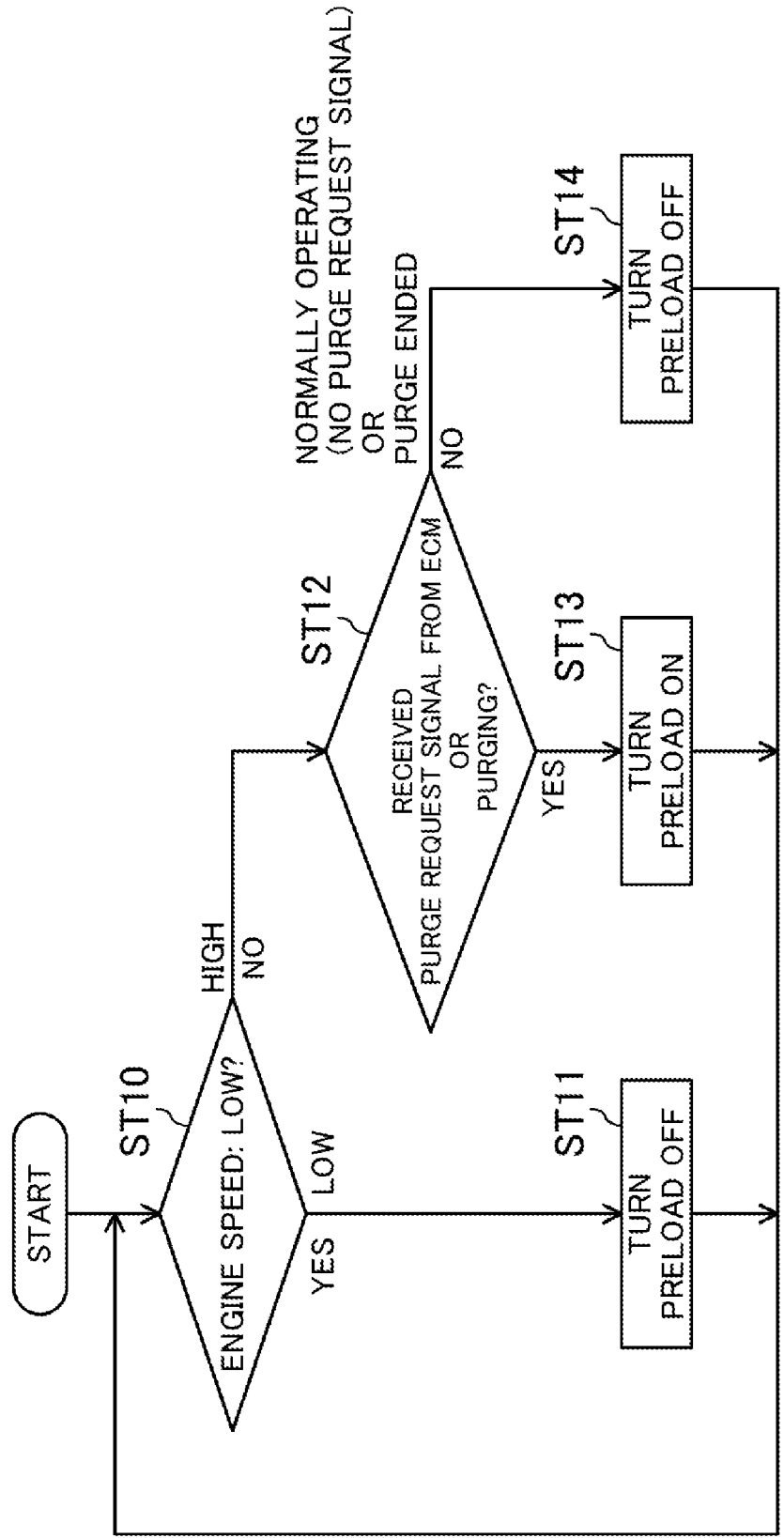
FIG. 4 is a flowchart of an SCR board constituting an engine-driven power generator according to an embodiment.
Figure 5:
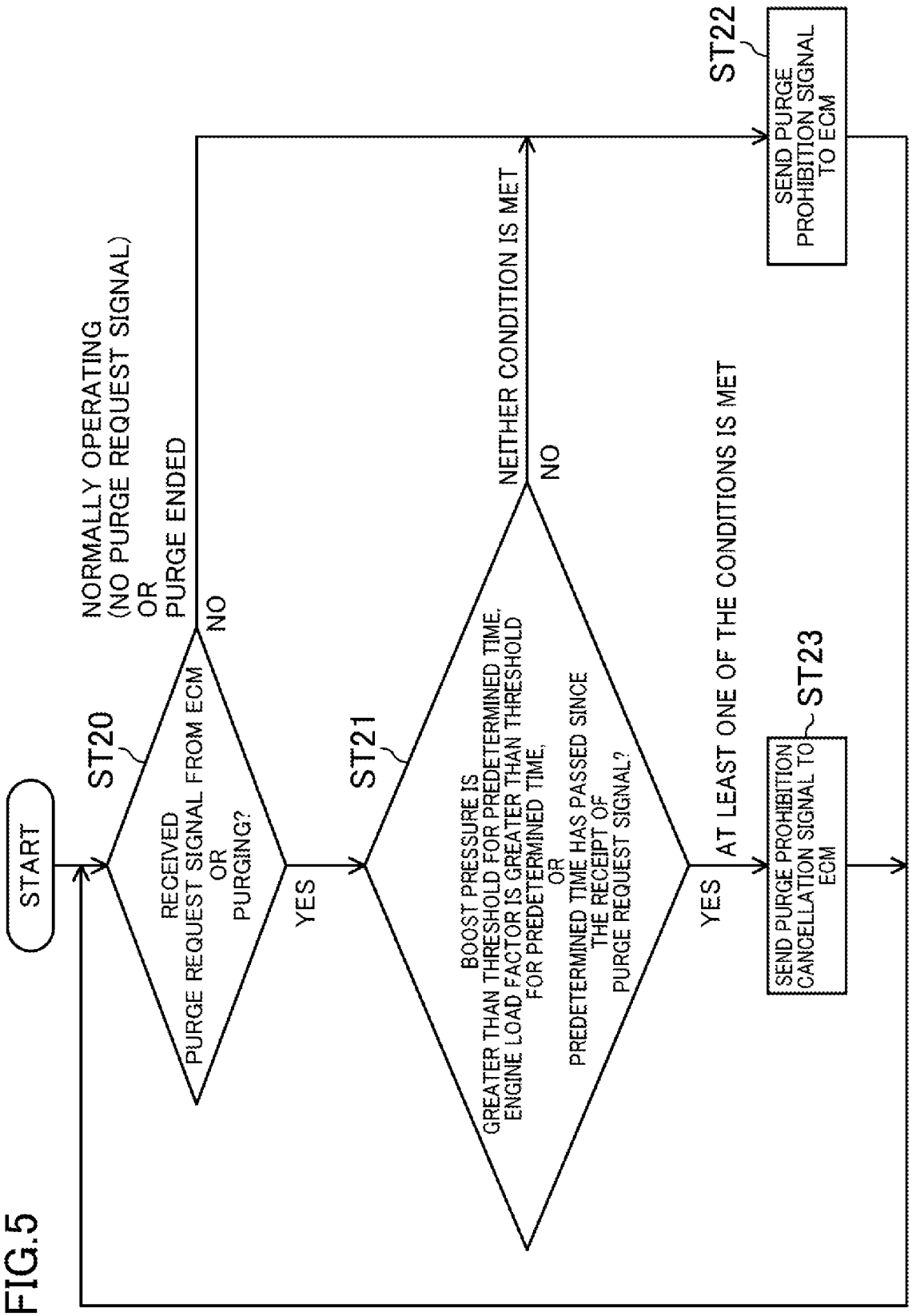
FIG. 5 is a flowchart of a control board constituting an engine-driven power generator according to an embodiment.

FIG. 4 shows an outline of a purge process control flow in the SCR board 52, and FIG. 5 an outline of a purge process control flow in the control board 53.

As shown in FIG. 4, in the SCR board 52, whether the speed of the engine 10 is low or high is determined in step ST10. In the present embodiment, the engine 10 changes the operation mode depending on whether the engine speed is low or high. A low-speed rotation mode is, for example, an operation mode for first several minutes during warming-up after the start, and in this case, the engine 10 rotates at about 1000 rpm, for example. A high-speed rotation mode is an operation mode for the power generator. For example, when an output frequency of the power generator is 60 Hz, the engine 10 rotates at about 1800 rpm, and the switching between the low-speed rotation mode and the high-speed rotation mode is manually performed.

If the determination in step ST10 is true, that is, in the low-speed rotation mode, the SCR board 52 allows the contactor 54 to disconnect the preload 40 and the generator 30 to turn the preload 40 off in the subsequent step ST11. Thereafter, the flow returns to step S10.

If the determination in step ST10 is false, i.e., in the high-speed rotation mode, it is determined in the subsequent step ST12 whether the purge request signal has been received from the ECM 51 or a signal indicating that the purge process is being performed has been received from the ECM 51. If the determination in step ST12 is true, the SCR board 52 allows the contactor 54 to connect the preload 40 and the generator 30 to turn the preload 40 on in the subsequent step ST13. Thereafter, the flow returns to step S10.

If the determination in step ST12 is false, the SCR board 52 allows the contactor 54 to disconnect the preload 40 and the generator 30 to turn the preload 40 off in the subsequent step ST14. Thereafter, the flow returns to step S10.

Then, as shown in FIG. 5, in the control board 53, it is determined in step ST20 whether the purge request signal has been received from the ECM 51 or the signal indicating that the purge process is being performed has been received from the ECM 51. If the determination in step ST20 is true, the flow proceeds to the subsequent step ST21. If the determination in step ST20 is false, the flow proceeds to the subsequent step ST22, and the control board 53 transmits the purge prohibition signal to the ECM 51. Thereafter, the flow returns to step ST20.

In step ST21, it is determined whether the boost pressure of the engine 10 is greater than a predetermined threshold (a value converted from 111% which is a reference boost pressure comparison value to be described later) for a predetermined time, the engine load factor is greater than about 34% which is a predetermined threshold for a predetermined time, or a predetermined time has passed since the receipt of the purge request signal. The predetermined time can be counted in the control board 53, for example, as a time lapse of one to five minutes. It is assumed that the determination of the lapse of time after the receipt of the purge request signal is made true in the low-speed rotation mode in FIG. 4, i.e., during the warming-up.

If the determination in step ST21 is true, the control board 53 transmits the cancellation signal for the purge prohibition signal to the ECM 51 in the subsequent step ST23. If the determination in step ST21 is false, the flow proceeds to the subsequent step ST22, and the control board 53 transmits the purge prohibition signal to the ECM 51.

It has been confirmed that if an electric heater whose capacity is set to about 8.6 kW to 12 kW is used as the preload 40, the speed governing performance of the engine 10 can be maintained when the boost pressure of the turbocharger 13 during a no-load operation with the amount of the intake air reduced is more than about 90% of the boost pressure during the normal operation, i.e., when no purge process is performed. This is based on the premise that the speed governing performance of the engine 10 can be maintained as long as the boost pressure can be kept approximately equal to that in a standby state with no load even during the purge process.

It has also been confirmed that the speed governing performance of the engine 10 can be maintained when the load factor of the engine 10 during the no-load operation with the amount of the intake air reduced is more than about 30%. In this case, the present invention is also applicable to an engine with no turbocharger 13.

EXAMPLES

A speed governing performance test was performed using the engine-driven power generator 1 of the present embodiment as an example. In this test, a load value that could be inputted during the purge process was reduced to about 55% of a load value that could be inputted during the normal operation in which no purge process was performed. Then, it has been confirmed that in an example in which the preload 40 having the capacity described above was inputted before the purge process, the load value that could be inputted during the purge process was recovered to about 85% of the load value that could be inputted during the normal operation.

A reference boost pressure comparison value described below represents a value (%) calculated with reference to the boost pressure during the normal operation in which neither the load nor the preload is inputted and no purge process is performed.

It has been confirmed that the reference boost pressure comparison value decreased to 66% when neither the load (main load) nor the preload was inputted during the purge process.

In selecting a resistance value required for the electric heater used as the preload 40, i.e., a required preload capacity, to maintain the speed governing performance, a plurality of capacities were set, and a preload set during the purge process was sequentially inputted to measure the engine load factor and the reference boost pressure comparison value with respect to the set values. In this test, no load (main load) was inputted.

As a result, it has been confirmed that the reference boost pressure comparison value was as low as about 70% when the capacity of the preload 40 was 8.4 kW or less, and was recovered up to 92% when the capacity of the preload 40 was 8.6 kW.

It has also been confirmed that the reference boost pressure comparison value had little variation when the capacity was 8.6 kW or more.

From the above, the reference boost pressure comparison value relative to the capacity of the preload 40 may be satisfactory if it is 90% or more, but in the present embodiment, the capacity of the preload 40 is set to 12 kW to make some allowance.

As can be seen in the foregoing, when the boost pressure is 90% or more with respect to that in the normal operation, sufficient speed governing performance can be achieved even during the purge process.

On the other hand, the engine load factor was 27% or less when the capacity was 8.4 kW or less, and exceeded 30% when the capacity was 8.6 kW or more. It has been confirmed that the load factor had relatively small variation when the capacity was between 8.6 kW and 14 kW, and in this case, a value of 30% or more can be set as a threshold.

In step ST21 shown in the flowchart of FIG. 5, the reference boost pressure comparison value, which was 111%, for converting the threshold of the boost pressure of the engine 10, and the threshold of the engine load factor, which was about 34%, were values obtained when a load of 12 kW was inputted.

Further, regarding the boost pressure when the preload 40 having the capacity set to 12 kW was inputted before the purge process, it has been confirmed that the reference boost pressure comparison value did not fall below 97% during the purge process because the preload 40 was inputted before the input of the load (main load). It has also been confirmed that the boost pressure was effectively raised when the load of 5 kW or less was inputted and a load of 35 kW or more was inputted.

[Advantages]

According to this embodiment, the electric heater, which is the preload 40, is connected to the generator 30 (immediately) before periodically, or automatically, performing the purge process of removing the white product from the urea SCR apparatus. When the preload 40 is inputted to the generator 30 in this way, the boost pressure of the intake air to the engine 10 increases, and the torque of the engine 10 increases, thereby improving the speed governing performance. Thus, the main load 60, which is higher than a main load inputted with no input of the preload 40 when performing the purge process, can be inputted. Thus, there is little need to limit the capacity of the main load (device) 60 which can be inputted during the purge process.

For example, from the viewpoint of maintaining the speed governing performance, the capacity of the main load during a conventional purge process with no preload input is only about 55% of the capacity of the main load during the normal operation. On the other hand, during the purge process according to the present embodiment in which the preload 40 is inputted, the capacity of the main load 60 is increased to about 85% of that during the normal operation.

Further, regarding an intermittent and large load such as a pump jack used in the site of oil field excavation, for example, response to the intermittent load is improved even during the purge process, and thus, a situation in which the pump jack stops can be avoided.

Moreover, since the exhaust temperature is raised by the amount corresponding to the preload 40 inputted, the purge process on the exhaust purification apparatus 20 is more normally completed.

The engine-driven working machine of the present embodiment is not limited to the engine-driven power generator, and can be applied to an engine-driven welding machine using a diesel engine as a driver for a power generator.

(Variation of Exhaust Purification Apparatus)

In the above embodiment, the urea SCR apparatus has been used as the exhaust purification apparatus 20, but a DPF apparatus may be used in place of the urea SCR apparatus as a variation of the exhaust purification apparatus 20. In this case, the exhaust purification apparatus 20 collects particulate materials (PM), thereby purifying the exhaust gas emitted outside. However, when the diesel engine is continuously operated for a long time, PM is attached to the DPF apparatus to block the flow of the exhaust gas, resulting in a decrease in the output of the diesel engine. Thus, a heat regeneration process is performed to remove PM attached to the DPF apparatus.

Even when the DPF apparatus is used as the exhaust purification apparatus 20, the exhaust temperature is raised to 350° C. or more during the purge process (regeneration process for the DPF apparatus) according to the present embodiment. This can remove PM deposited on the filter.

The engine-driven working machine of the present disclosure can reduce deterioration of speed governing performance even in a purge process (deposit removal process) performed on an exhaust purifying apparatus, and is useful, for example, as an engine-driven working machine that can be operated in an unattended situation.

The invention claimed is:

1. An engine-driven working machine, comprising:
a diesel engine;
a generator driven by the diesel engine;
an exhaust purifier that purifies an exhaust gas emitted from the diesel engine;
at least one intake air reducer that reduces an amount of intake air taken into the diesel engine;
a preload that is able to be connected between the generator and a load; and
a turbocharger for supercharging the intake air of the diesel engine,
wherein:
the engine-driven working machine reduces the amount of the intake air by means of the intake air reducer to raise a temperature of the exhaust gas emitted from the diesel engine so that a deposit in the exhaust purifier is removed, and
the engine-driven working machine connects the preload to the generator so that a load is applied forcibly to increase a supercharging pressure of the turbocharger and increase the amount of the intake air taken into the diesel engine, prior to reducing the amount of the intake air by means of the intake air reducer to remove the deposit in the exhaust purifier, thereby reducing a drop of the supercharging pressure when then intake air reducer reduces the amount of the intake air to remove the deposit in the exhaust purifier.

2. The engine-driven working machine of claim 1, wherein the exhaust purifier is a urea selective catalyst reduction apparatus.

3. The engine-driven working machine of claim 1, wherein the exhaust purifier is at least one of a urea selective catalyst reduction apparatus or a diesel particulate filtering apparatus.

4. The engine-driven working machine of claim 1, wherein:
the intake air reducer is a movable vane of the turbocharger.

5. The engine-driven working machine of claim 1, wherein a capacity of the preload is set such that, when the amount of the intake air is reduced by the intake air reducer to remove the deposit in the exhaust purifier, the supercharging pressure during a no-load operation of the diesel engine becomes 90% or more of the supercharging pressure during the no-load operation before reducing the amount of the intake air.

6. The engine-driven working machine of claim 1, wherein:
the diesel engine is provided with a throttle valve that adjusts the amount of the intake air taken into the diesel engine, and
the intake air reducer is the throttle valve.

7. The engine-driven working machine of claim 1, wherein the preload is an electric heater.

8. The engine-driven working machine of claim 7, wherein the preload is arranged in an exhaust passage of the diesel engine.

9. The engine-driven working machine of claim 1, wherein the deposit in the exhaust purifier is removed every predetermined time.

10. The engine-driven working machine of claim 1, wherein a capacity of the preload is set such that, when the amount of the intake air is reduced by the intake air reducer to remove the deposit in the exhaust purifier, a load factor of the engine during a no-load operation of the diesel engine becomes 30% or more.

11. The engine-driven working machine of claim 1, further comprising:
an engine controller that controls an operation of the diesel engine; and
a preload controller that controls an operation of the preload,
wherein:
the engine controller transmits a purge request signal for requesting a purge process of removing the deposit in the exhaust purifier to the preload controller, and
the preload controller turns the preload on when the purge request signal is received.

12. The engine-driven working machine of claim 11, further comprising:
a controller that transmits a purge prohibition signal for prohibiting the purge process and a purge prohibition cancellation signal for canceling the purge prohibition signal to the engine controller,
wherein the controller transmits the purge prohibition signal to the engine controller in a normal operation and transmits the purge prohibition cancellation signal to the engine controller after a predetermined time has passed since the receipt of the purge request signal.

13. The engine-driven working machine of claim 12, wherein the controller transmits the purge prohibition cancellation signal to the engine controller at least one of: when the supercharging pressure is: greater than a threshold for a predetermined time, when an engine load factor is greater than a threshold for a predetermined time, or after a predetermined time has passed since the receipt of the purge request signal.

* * * * *